United States Patent
Klau

(10) Patent No.: US 9,497,276 B2
(45) Date of Patent: Nov. 15, 2016

(54) TRACKABLE SHARING OF ON-LINE VIDEO CONTENT

(71) Applicant: Richard Parker Klau, San Ramon, CA (US)

(72) Inventor: Richard Parker Klau, San Ramon, CA (US)

(73) Assignee: GOOGLE INC., Mountain View, CA (US)

( * ) Notice: Subject to any disclaimer, the term of this patent is extended or adjusted under 35 U.S.C. 154(b) by 622 days.

(21) Appl. No.: 13/654,266

(22) Filed: Oct. 17, 2012

(65) Prior Publication Data

US 2014/0108531 A1  Apr. 17, 2014

(51) Int. Cl.
*G06F 15/173* (2006.01)
*H04L 12/28* (2006.01)
*H04L 29/08* (2006.01)
*H04N 21/2743* (2011.01)
*H04N 21/4788* (2011.01)
*G06F 17/30* (2006.01)

(52) U.S. Cl.
CPC .......... *H04L 67/22* (2013.01); *G06F 17/3089* (2013.01); *H04N 21/2743* (2013.01); *H04N 21/4788* (2013.01)

(58) Field of Classification Search
CPC ................ H04L 41/0213; H04L 29/08072; H04L 29/06; H04L 41/22; H04L 41/12; H04L 45/00; H04L 29/0653; H04L 49/3009; H04L 47/10
USPC .......................................... 707/769; 709/223
See application file for complete search history.

(56) References Cited

U.S. PATENT DOCUMENTS

| 2006/0116117 | A1 * | 6/2006 | Takase | H04L 63/0407 455/420 |
| 2007/0088817 | A1 | 4/2007 | Li | |
| 2007/0255752 | A1 * | 11/2007 | Miller | G06F 17/30038 |
| 2008/0320531 | A1 | 12/2008 | Kim | |

(Continued)

FOREIGN PATENT DOCUMENTS

| WO | 2007082167 | 7/2007 |
| WO | 2009046324 | 4/2009 |
| WO | 2010141939 | 12/2010 |

OTHER PUBLICATIONS

International Preliminary Report on Patentability, Written Opinion of the International Searching Authority, dated Apr. 29, 2014 for PCT/US2013/065540.

(Continued)

*Primary Examiner* — Emmanuel L Moise
*Assistant Examiner* — Mahran Abu Roumi
(74) *Attorney, Agent, or Firm* — Lowenstein Sandler LLP

(57) ABSTRACT

The sharing of video content published online is tracked enabling the generation of a share tracking report. A first client shares video content using a first identifier that associates the first client to the video content and sharing statistics are updated. A second client accesses the video content via the first identifier and is associated with a second identifier that can used to share the video content by the second client. The second identifier is also associated with the first identifier to create a chain of discovery. A subsequent client accesses the video content via the second identifier and the sharing statistics associated with the second identifier are updated, thus continuing to add to the chain of discovery. A report is generated comprising sharing information, which includes one or more of a chain of discovery and at least one sharing statistic.

9 Claims, 9 Drawing Sheets

(56) References Cited

U.S. PATENT DOCUMENTS

| | | |
|---|---|---|
| 2009/0037967 A1 | 2/2009 | Barkan et al. |
| 2009/0083417 A1 | 3/2009 | Hughes et al. |
| 2009/0100456 A1 | 4/2009 | Hughes |
| 2009/0259633 A1* | 10/2009 | Bronstein ......... G06F 17/30799 |
| 2011/0029666 A1 | 2/2011 | Lopatecki et al. |
| 2011/0137753 A1 | 6/2011 | Moehrle |
| 2011/0225608 A1 | 9/2011 | Lopatecki et al. |
| 2013/0018938 A1* | 1/2013 | Wood ................. H04L 65/4069 709/203 |
| 2013/0226962 A1* | 8/2013 | Riggs .................. G06F 21/6254 707/769 |
| 2014/0143378 A1* | 5/2014 | Bhupalam ........... H04L 65/4084 709/217 |

OTHER PUBLICATIONS

Extended European Search Report for EP Patent Application No. 13847984.5, dated Jun. 6, 2016, 7 pages.

* cited by examiner

TRACKABLE SHARING OF ON-LINE VIDEO CONTENT

BACKGROUND

Technical Field

The present disclosure generally relates to sharing video content published online and, more specifically, to tracking the sharing of video content published online.

Background

Entities that publish content, such as video data, typically desire analytic data about the published content. For example, the publishers may seek information about the number of times the video data is viewed or other metrics describing performance of the video data. However, publishers are unable to obtain valuable analytic data about the impact client sharing has on the metrics and distribution of the published content. For example, the publishers cannot see how many clients are sharing the content, who those clients are, how many views those clients generate by sharing. Such information may prove valuable to a publisher and the client. For example, a publisher may like to thank a particular client that is responsible for a large number of the views or tell that client about the publisher's latest content, in the hope that the client will continue to share the publisher's content and generate a large number of views.

The clients may benefit from such information as well. For example, a client may negotiate for financial compensation from the publisher for sharing the publisher's content in the future. For another example, the client may benefit from getting a better sense of its audience's size and composition. Further, it may be beneficial for the clients to get valuable feedback about which of their video shares are driving engagement, allowing them to tailor what videos they share in the future to more closely match what their audience responds to.

SUMMARY

Embodiments disclosed herein provide a system and method for tracking the sharing of video content published online. A first client triggers a request to share video content published online. In some embodiments the request is triggered manually while in other embodiments the request is triggered automatically. A share request receiver receives the request to share the video content. An identifier generator engine generates a first identifier associated with the video content. The client-identifier associator associates the first identifier with the first client. The first identifier is provided to the first client. The client shares the first identifier.

The analytics engine detecting use of the first identifier to access the video content updates the sharing information, e.g., sharing statistics, associated with the first identifier. A second client accesses the video content using the first identifier and triggers a request to share the video content. The request to share is received by the share request receiver. The identifier generator engine generates a second identifier associated with the video content, and the client-identifier associator associates the second identifier with the second client. The client-identifier associator associates the second identifier and the first identifier to create a chain of discovery, which is included in the sharing information. The second client shares the second identifier.

The analytics engine detecting use of the second identifier to access the video content updates the sharing information, e.g., sharing statistics, associated with the second identifier. In one embodiment, the analytics engine will also update the sharing information associated with the first identifier responsive to detecting the use of the second identifier.

A report generator engine receives a request for a share tracking report including sharing information. Responsive to the request for the share tracking report, the report generator retrieves the share tracking information, generates a share tracking report comprising the sharing information and sends the share tracking report to the requestor. In one embodiment, the share tracking report includes one or more of a chain of discovery and at least one sharing statistic.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
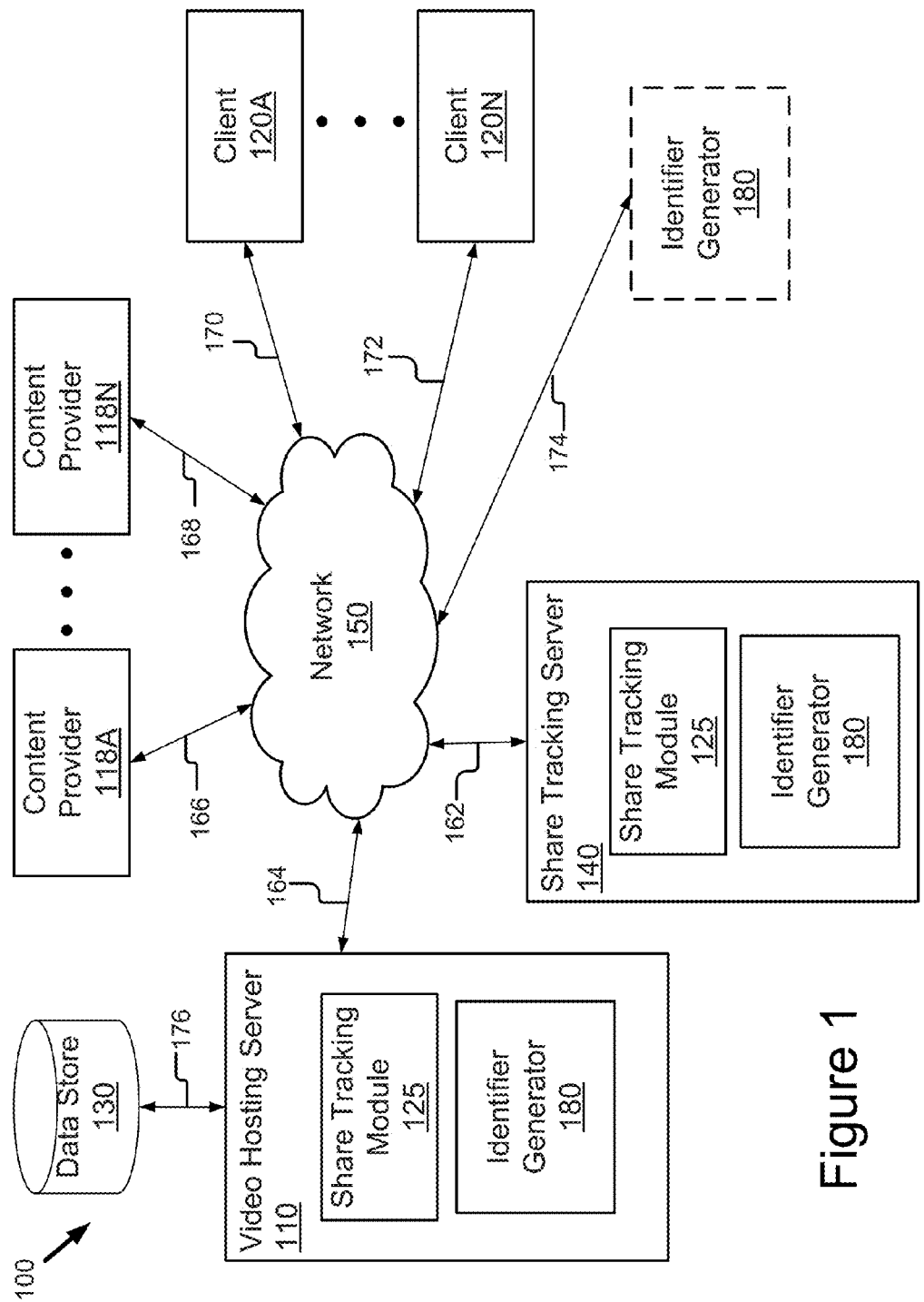
FIG. 1 is a high-level block diagram of a system for tracking the sharing of video content published online according to one embodiment.

A system for tracking the sharing of video content published online is described below. In the following description, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk-read/write (CD-R/W) and digital video disc (DVD).

A data processing system suitable for storing and/or executing program code includes at least one processor coupled directly or indirectly to memory elements through a system bus. The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 shows an embodiment of a system 100 for tracking the sharing of video content published online. In the embodiment depicted by FIG. 1, the system 100 includes a video hosting server 110, a data store 130, a share tracking server 140, a network 150, one or more content providers 118A-118N (also referred to individually and collectively as 118) and one or more clients 120A-120N (also referred to individually and collectively as 120). However, in other embodiments, the system 100 may include different and/or additional components than those depicted by FIG. 1. For example, while FIG. 1 illustrates a single network 150, in other embodiments, the system 100 includes any number of networks 150. According to some embodiments, the system 100 includes an identifier generator 180. According to other embodiments, the identifier generator 180 is including in the video hosting server 110 and/or the share tracking server 140.

The network 150 is a conventional type of network, wired or wireless, and may have any number of configurations such as a star configuration, token ring configuration or other configurations known to those skilled in the art. In one embodiment, the network 150 comprises one or more of a local area network (LAN), a wide area network (WAN) (e.g., the Internet), and/or any other interconnected data path across which multiple devices communicate. In another embodiment, the network 150 is a peer-to-peer network. The network 150 is coupled to or includes portions of a telecommunications network for sending data in a variety of different communication protocols. For example, the network is a 3G network or a 4G network. In yet another embodiment, the network 150 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 150 are encrypted using conventional encryption technologies such as secure sockets layer (SSL), secure HTTP and/or virtual private networks (VPNs).

In the illustrated embodiment, the video hosting server 110 is communicatively coupled to the network 150 via signal line 164. The content providers 118A and 118N are communicatively coupled to the network 150 via signal lines 166 and 168, respectively. Clients 120A and 120N are communicatively coupled to the network 150 via signal lines 170 and 172, respectively. The identifier generator 180 is communicatively coupled to the network 150 via signal line 174. The share tracking server 140 is communicatively coupled to the network 150 via signal lines 162.

The identifier generator 180 generates identifiers and associates the identifier with the video content intended to be shared. In one embodiment, the identifiers generated by the identifier generator 180 are unique. In one embodiment, the identifier is a Uniform Resource Locator (URL) and the identifier generator 180 is a URL shortener. An example of a URL shortener is Google's goo.gl URL shortener. Other URL shorteners are known as well and can be adapted to operate according to the disclosure herein. A person having ordinary skill in the art will recognize that URL shortening is just one example and many other methods of identifying video content and directing clients to the video content and can be adapted to operate according to the disclosure herein.

In one embodiment, the identifier generator 180 is a separate service, e.g., goo.gl, communicatively coupled to the network 150 via signal line 174. In other embodiments, the identifier generator and/or its functionality are included in the share tracking server 140 or the video hosting server 110.

The share tracking server 140 is one or more devices having at least one processor coupled to at least one storage device including instructions for execution by the processor. For example, the share tracking server 140 is one or more servers or other computing devices having data processing and data communication capabilities. The share tracking server 140 includes a share tracking module 125, which, upon execution, tracks the sharing of video content published online using one or more identifiers associated with one or more clients 120. In one embodiment, an identifier from the identifier generator 180 is communicated to the share tracking server 140 via the network 150. In another embodiment, the share tracking server 140 includes an identifier generator 180 and/or its functionality. The share tracking module 125 is further described below in conjunction with FIG. 3. In one embodiment, the share tracking module 125 and/or its functionality are included in the video hosting server 110.

The video hosting server 110 is a allows users to access video content, via searching and/or browsing interfaces. An example of a video hosting server 110 is a YOUTUBE™ server, which can be accessed at www.youtube.com. Other video hosting servers are known as well, and can be adapted to operate according to the disclosure herein. It will be understood that the term "server" represents any computer system adapted to serve content using any internetworking protocol, and is not intended to be limited to video content uploaded or downloaded via the Internet or the HTTP protocol.

In one embodiment, the video hosting server 110 receives video data, or other video content, via uploads from a client 120 or uploads from a content provider 118. Alternatively, the video hosting server 110 searches, or crawls, other web sites, databases or other sources for video content, such as video data. In another embodiment, the video hosting server 110 receives video content from a combination of uploads and searching for video content. For example, a video hosting server 110 receives video content from one or more clients 120 responsive to the client 120 receiving a user request to upload video content to the video hosting site 100. As another example, the video hosting server 110 receives video content by crawling clients 120 and/or crawling a video content provider 118 and/or additional sources to obtain video content, allowing real-time acquisition of video content.

In one embodiment, the video hosting server 110 is configured to receive and distribute various types of video content, such as video data, audio data, image data, textual data or other types of data. The video content received and/or distributed by the video hosting server 110 may be represented using any suitable media type and/or file type. For example, the video hosting server 110 shares video content such as a video, audio, combination of video and audio, an image such as a JPEG or GIF file and/or a text file.

The data store 130 is a non-volatile memory device or similar persistent storage device and media coupled to the video hosting server 110 for storing video content and metadata associated with stored video content. For example, the data store 130 and the video hosting server 110 exchange data with each other via the network 150. Alternatively, the data store 130 and the video hosting server 110 exchange data via a dedicated communication channel, for example, via signal line 176. While the embodiment shown by FIG. 1 depicts the data store 130 and video hosting server 110 as discrete components, in other embodiments a single component includes the data store 130 and the video hosting server 110.

The content provider 118 is any device that provides content to the video hosting server 110. For example, the content provider 118 is a computing device that uploads a video to the video hosting server 110. The content provider 118 is communicatively coupled to the network 150. In one embodiment, the content provider 118 is a client 120. In one embodiment, the content provider 118 communicates video data to the video hosting server 110, allowing video from the content provider 118 to be streamed to one or more clients 120 using the video hosting server 110. In yet another embodiment, the content provider 118 is the same entity that operates the video hosting server 110. In one embodiment, the content provider 118 provides one or more functions. Examples of functions provided by the content provider 118 include uploading video content to the video hosting server 110, editing video content stored by the video hosting server 110, removing video content from the video hosting server 110, editing video content provider preferences associated with a video content or any other suitable function.

A client 120 executes a web browser or another application and connects to the video hosting server 110 via the network 150. In one embodiment, the client 120 includes a variety of different computing devices. Examples of a client device 120 include, but are not limited to: a personal computer, a personal digital assistant, an internet-capable television, a tablet computer, a smart phone or a laptop computer. A client 120 includes a processor (not pictured), a memory (not pictured) and other components conventional to a computing device. In one embodiment, the client 120 is communicatively coupled to the network 150.

In one embodiment, the client 120 is configured as a content provider 118 to provide video data, or other content, to the video hosting server 110. In yet another embodiment, the client 120 is configured to access video content, such as video data, stored by the video hosting server 110. For example, a client 120 includes an embedded video player (e.g., the Flash™ player from Adobe System, Inc.) adapted for the video content formats used in the video hosting server 110 so that a user of the client 120 is able to view a video from the video hosting server 110 using the embedded video player. In yet another embodiment, the client 120 configures user preferences related to the video contents.

Computing Device 200

Figure 2:
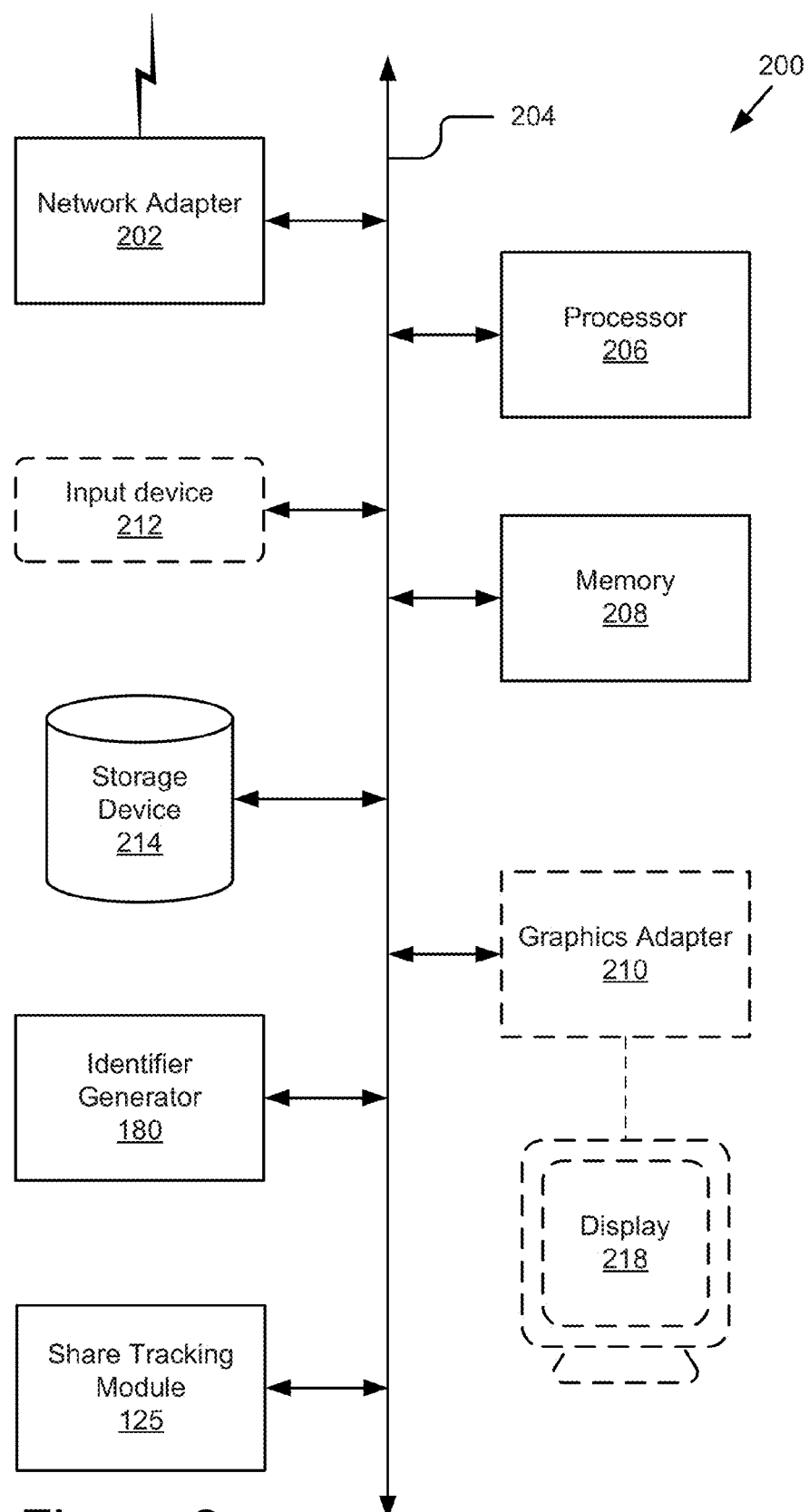
FIG. 2 is a block diagram of a computing device according to one embodiment.

FIG. 2 is a block diagram of an embodiment of a computing device 200 in accordance with one embodiment. In one embodiment, the computing device 200 represents the functionality and components of the video hosting server 110. In another embodiment, the computing device 200 represents the functionality and components of the share tracking server 140. As illustrated in FIG. 2, computing device 200 includes a network adapter 202 coupled to a bus 204. According to one embodiment, also coupled to the bus 204 are at least one processor 206, memory 208, a graphics adapter 210, an input device 212, a storage device 214, an identifier generator 180 and a share tracking module 125. In one embodiment, the functionality of the bus 204 is provided by an interconnecting chipset. The content management system 110 also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the content management system 110. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The computing device 200 also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the content management module 110. In one embodiment, the content management module 201 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. For clarity, instructions and/or data stored by the storage device 214 are described herein as different functional "modules," where different modules are different instructions and/or data included in the storage device 214 that cause the described functionality when executed by the processor 206. In one embodiment, the modules are stored in the memory 208.

The input device 212 may include a mouse, track ball, or other type of pointing device to input data into the content management system 110. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the computing device 200 to the network 150 enabling the computing device 200 to transmit and receive data from the network 150.

FIG. 2 further illustrates a share tracking module 125 communicating over bus 204 with the other components of the computing device 200. The share tracking module 125 provides logic and instructions for tracking the sharing of video content published online. In an embodiment, the share tracking module 125 can be implemented in hardware (e.g., in an FPGA), as illustrated in FIG. 2. In another embodiment, the share tracking module 125 can include software routines and instructions that are stored, for example, in memory 208 and/or storage device 214 and executable by the processor 206 to cause the processor 206 to track the sharing of video content published online. Details describing the functionality and components of the share tracking module 125 will be explained in further detail below with regard to FIG. 3.

As is known in the art, computing device 200 can have different and/or other components than those shown in FIG. 2. In addition, the computing device 200 can lack certain illustrated components. In one embodiment, the computing device 200 lacks an input device 212, graphics adapter 210, and/or display 218. In another embodiment, the computing device 200 lacks an identifier generator 180, because, for example, the share tracking module 125 includes the functionality to generate identifiers, or a different server or device includes the identifier generator 180 and/or its functionality. Moreover, the storage device 214 can be local and/or remote from the computing device 200 (such as embodied within a storage area network (SAN)).

As is known in the art, the computing device 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Share Tracking Module 125

Figure 3:
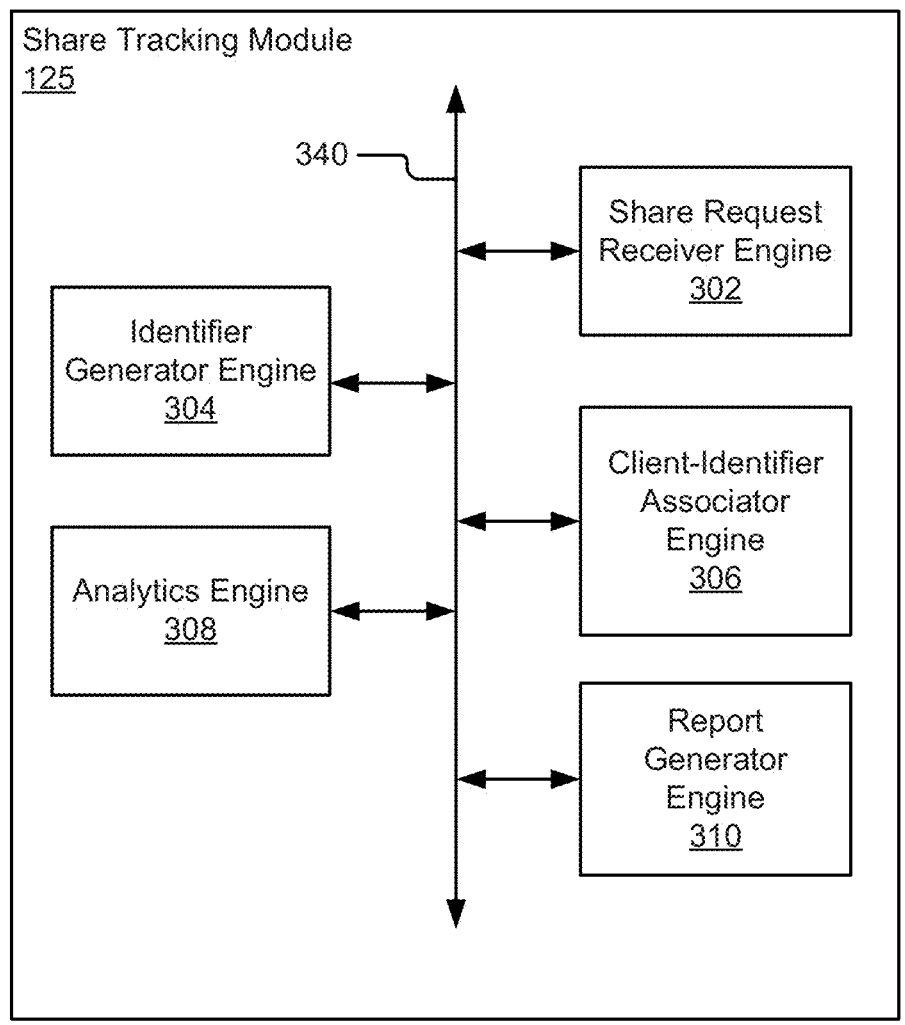
FIG. 3 is a block diagram of a share tracking module according to one embodiment.

FIG. 3 is a block diagram illustrating the share tracking module 125 according to one embodiment. The share tracking module 125 is software and routines executable by the processor 206 for tracking the sharing of video content published online. In one embodiment, the share tracking module 125 is a set of instructions executable by the processor 206 to provide the functionality described below for tracking the sharing of video content published online. In another embodiment, the share tracking module 125 is stored in the memory 208 of the computing device 200 and is accessible and executable by the processor 206. In either embodiment, the share tracking module 125 is adapted for cooperation and communication with the processor 206 and other components of the computing device 200.

In the embodiment illustrated embodiment, the share tracking module 125 includes a share request receiver engine 302, an identifier generator engine 304, a client-identifier associator engine 306, an analytics engine 308 and a report generator engine 310. However, in other embodiments, the storage device 214 includes different and/or additional modules than the ones depicted in FIG. 3. For example, in one embodiment, the share tracking module 125 lacks an identifier generator engine 304 and includes a requestor engine (not shown) for generating and sending a request for an identifier to the identifier generator 180. The share tracking module 125 is coupled to the processor 206 and the components of computing device 200 via the bus.

In one embodiment, the modules are implemented using instructions and/or data included in the storage device 214 or memory 208, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled via signal line 340, acting as a bus 340, configured to provide the functionality of the modules further described below.

The share request receiver engine 302 is software and routines executable by the processor 206 for receiving a request to share video content. In one embodiment, the share request receiver engine 302 is a set of instructions executed by the processor 206 to provide the functionality described below for receiving a request to share video content. In another embodiment, the share request receiver engine 302 is stored in the memory 208 of the computing device 200 and is accessible and executable by the processor 206. In either embodiment, the share request receiver engine 302 is adapted for cooperation and communication with the other components of the share tracking module 125 via signal line 340.

In one embodiment, the request to share video content is manually triggered, e.g., the user of a client selecting a button or link explicitly for sharing the video content. In one embodiment, sharing video content includes publishing video content available on one website on another website. For example, if a user finds video content on a video hosting website that the user thinks may be of interest to his contact on his social network website, the user may publish (share it) on the user's social network website. In another embodiment, the request to share video content is triggered automatically, e.g., a client's request to access a page containing video content generates a request to share the video content. In one embodiment, the request to access video content is a request to share video content. In one embodiment, a request to share video content is made by the client 120 on the video hosting server 110. In one embodiment, the client 120 can share the video content without generating a request to share video content. In one such embodiment, subsequent sharing is unable to be tracked and/or unable to be attributed to the client 120. In another embodiment, the client 120 can opt out of share tracking in part or in whole, e.g., by altering preferences or privacy settings.

The identifier generator engine 304 is software and routines executable by the processor 206 for generating and associating an identifier with video content in response to a request to share the video content. In one embodiment, the identifier generator engine 304 is a set of instructions executed by the processor 206 to provide the functionality described below for generating and associating an identifier with video content in response to a request to share video content. In another embodiment, the identifier receiver engine 304 is stored in the memory 208 of the computing device 200 and is accessible and executable by the processor 206. In either embodiment, the identifier generator engine 304 is adapted for cooperation and communication with the other components of the share tracking module 125 via signal line 340.

As discussed above, in one embodiment, the identifiers generated by the identifier generator engine 304 are unique. In one embodiment, the identifier is a URL and the identifier generator engine 304 is a URL shortener. An example of a URL shortener is Google's goo.gl URL shortener. Other URL shorteners are known as well and can be adapted to operate according to the disclosure herein. A person having ordinary skill in the art will recognize that URL shortening is just one example and many other methods of identifying video content and directing clients to the video content exist and can be adapted to operate according to the disclosure herein.

In one embodiment, the identifier generator engine 304 (or identifier generator 180, depending on the embodiment) generates and associates an identifier with video content in response to receiving a request to share video content. In another embodiment, the client 120 needs to be a recognized user, e.g., a registered user that is signed-in before the identifier generator engine 304 (or identifier generator 180, depending on the embodiment) generates and associates an identifier. In one such embodiment, if a request to share video content is received from an unrecognized client 120, e.g., a non-signed-in, registered user, no identifier is generated and a default identifier associated with the video content is used. In one embodiment, the default identifier is a naked URL, i.e., the URL for the video content without any additional identifiers. In one embodiment, the identifier generator engine 304 transmits the generated identifier to the client-identifier associator engine 306.

The client-identifier associator engine 306 is software and routines executable by the processor 206 for associating the identifier with the client 120 requesting to share the video content and storing the association. In one embodiment, the client-identifier associator engine 306 is a set of instructions executed by the processor 206 to provide the functionality described below for associating the identifier with the client requesting to share the video content and storing the association. In another embodiment, the client-identifier associator engine 306 is stored in the memory 208 of the computing device 200 and is accessible and executable by the processor 206. In either embodiment, the client-identifier associator engine 306 is adapted for cooperation and communication with the other components of the share tracking module 125 via signal line 340.

The client-identifier associator engine 306 associates the identifier, which is associated with the video content to be shared, with a client 120, thereby creating an association between the client 120 and the video content to be shared. In one embodiment, the client-identifier associator engine 306 associates an identifier with a client 120 if the client 120 is recognized. Otherwise, the identifier, e.g., a naked URL, is not associated with a client 120 and subsequent sharing by the client is not tracked. In one embodiment, the client 120 is recognized if the client 120 is a signed-in, registered user of the video hosting server 110 and the identifier is associated with the user/user's profile. In another embodiment, the client 120 is recognized if the client's 120 device identification number or IP address are available for association with the identifier. In one embodiment, if the client 120 is not recognized, the client-identifier engine 306 will associate the identifier with a username it generates, e.g., anonymous_738, and track the subsequent sharing of the client 120 by associating the identifier with the generated username.

In one embodiment, the client-identifier associations determine/are able to determine the chain of discovery for video content. The chain of discovery is a representation of how video content is discovered and disseminated. In one embodiment, the client-identifier associator engine 306 will associate more than one client 120 with an identifier. For example, if client 120A shares a first identifier that client 120B discovers and desires to share the video content, a second identifier generated for client 120B will also be associated with client 120A, or client 120A will be associated with the second identifier. In another embodiment, the client identifier associator engine 306 will associate an additional identifier with a client 120. For example, if client 120A shares a first identifier that client 120B discovers and desires to share, generating a second identifier, the first identifier is associated with the second identifier or vice versa. The chain of discovery is discussed in more detail in reference to FIGS. 9 and 10.

In one embodiment, the identification generator engine 304 and client associator engine 306 can be combined. In one embodiment, the combination of the identification generator engine 304 and client associator engine 306 is achieved by generating identifiers that associate the client with the video content. For example, if the client 120 is a signed-in, registered user of the video hosting server 110 known to/indexed by the video hosting server 110 as user_376, is requesting to share video content that is stored by the video hosting server 110 and indexed as video 5786, which the user accessed through a share from an anonymous client assigned the username anon_6789, the identifier could resemble 5786/a6789/u376. In this example, the identifier itself associates the video content (5786) with the client requesting to share the video content (u376). Additionally, this example of an identifier includes information about the chain of discovery, i.e., the video (5786) was posted by the content provider 118, an anonymous client (a6789) shared the video content, which is now subsequently being shared by client (u376).

The analytics engine 308 is software and routines executable by the processor 206 for recording and maintaining sharing statistics regarding video content and clients. In one embodiment, the analytics engine 308 is a set of instructions executed by the processor to provide the functionality described below for recording and maintaining sharing statistics regarding video content and clients. In another embodiment, the analytics engine 308 is stored in the memory 208 of the computing device 200 and is accessible and executable by the processor 206. In either embodiment, the analytics engine 308 is adapted for cooperation and communication with the other components of the share tracking module 125 via signal line 340.

The sharing statistics recorded and maintained by the analytics engine 308 can vary depending upon the embodiment. The sharing statistics can include any performance metric due to sharing. Sharing statistics can include but are not limited to the number of views, unique views, monetized views and the time viewed because of sharing, the percentage of total views, unique views, monetized views and time viewed because of sharing. Moreover, the sharing statistics can be associated with, indexed or otherwise organized by client 120, content provider 118 or content item for retrieval by the report generator engine 310.

The report generator engine 310 is software and routines executable by the processor 206 for generating a share tracking report including sharing information responsive to a request for sharing information. In one embodiment, the report generator engine 310 is a set of instructions executed by the processor to provide the functionality described below for generating a share tracking report including sharing information responsive to a request for sharing information. In another embodiment, the report generator engine 310 is stored in the memory 208 of the computing device 200 and is accessible and executable by the processor 206. In either embodiment, the report generator engine 310 is adapted for cooperation and communication with the other components of the share tracking module 125 via signal line 340.

In one embodiment, one or more of the content provider 118, client 120 and the video hosting server 110 are capable of requesting sharing information. The entity requesting sharing information whether a content provider 118, client 120 or video hosting server 110 herein be referred to as the requestor. In one embodiment, the request for sharing information is triggered manually, e.g., the content provider 118 or client 120 selects a button or a hypertext link associated with requesting sharing information. In another embodiment, the request for sharing information occurs automatically, e.g., a request for sharing information is generated when a client 120 or content provider 118 logs into the video hosting server 110. For another example, the sharing information for a content item may be requested by the video hosting server 110 when a client 120 requests access to the content item.

The share tracking report includes sharing information, but the sharing information included in the share tracking report can vary depending upon the embodiment. Sharing information can include one or more of a chain of discovery and one or more sharing statistics. In one embodiment, the sharing statistics included in the share tracking report varies depending upon the requestor. In one embodiment, the sharing statistics included in the share tracking report depend on the type of requestor, e.g., content provider 118, video hosting server 110, client 120 or recognized client 120. For example, a share tracking report for a content provider 118 may include statistics regarding monetized views, e.g., the number of monetized views due to each client's share, while a share tracking report for a recognized client 120 may not include statistics on monetized views. In another embodiment, the sharing statistics included in the share tracking report vary depending upon the requestor's settings or preferences. For example, a client 120 can request to include or exclude different metrics from the sharing statistics included in the share tracking report.

In one embodiment, the chain of discovery included in the share tracking report varies depending upon the requestor. In one embodiment, the chain of discovery can vary to include the upstream chain of discovery, i.e., how the requestor discovered the video content through sharing, downstream chain of discovery, i.e., what other clients discovered the video content through the requestor's sharing, or both. In one embodiment, the chain of discovery varies in length. For example, in one embodiment, the chain of discovery might be limited to the client that shared the video content with the requestor and the clients that accessed the requestor's subsequent share. In one embodiment, the chain of discovery included in the share tracking report depends on the type of requestor, e.g., content provider 118, video hosting server 110, client 120 or recognized client 120. For example, a share tracking report for a content provider 118 may include a complete chain of discovery (resembling FIG. 9), while a share tracking report for a recognized client 120 may include only the portion of the chain of discovery to which the client 120 belongs (resembling FIG. 10). In another embodiment, the sharing statistics included in the share tracking report vary depending upon the requestor's settings or preferences. For example, a client 120 can request to include or exclude the upstream chain of discovery.

Methods

Figure 4:
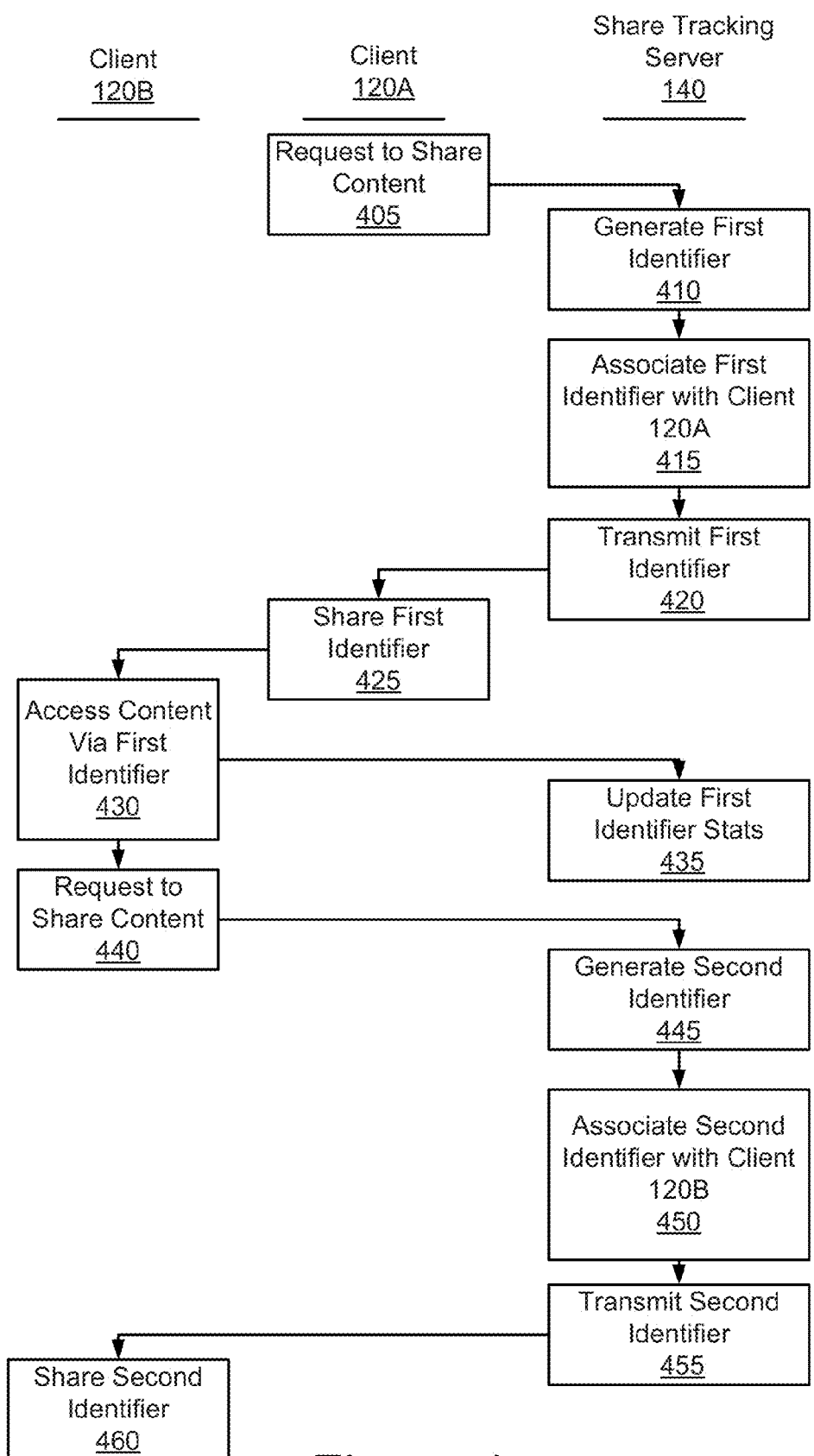
FIG. 4 is an event diagram of a method for tracking the sharing of video content published online according to one embodiment.

FIG. 4 illustrates an event diagram of a method for tracking the sharing of video content published online according to one embodiment. In the example shown by FIG. 4, the share tracking module 125 is part of a share tracking server 140, which tracks the sharing of video content published online. As discussed above, in other embodiments, the share tracking module 125 can be included in other components of the system 100, e.g., the video hosting server 110.

In the illustrated embodiment, the client 120A requests 405 to share video content. As discussed above, the request to share video content can triggered manually or automatically. Regardless, the request to share video content is transmitted to the share tracking server 140 where it is received by the share request receiver engine 302 of the share tracking module 125. Upon receiving the request to share video content, the identifier generator engine 304 generates 410 a first identifier associated with the video content. As discussed above, in other embodiments, the share tracking module 125 will request a first identifier from an identifier generator 180 which generates the first identifier. The client-identifier associator engine 306 associates 415 the first identifier with client 120A. As discussed above, in one embodiment, the client 120A will be identified as part of the first identifier. The first identifier is transmitted 420 to client 120A, and client 120A shares 425 the first identifier. Client 120B accesses 430 the video content via the first identifier. Responsive to the video content being accessed 430 by the first identifier, the analytics engine 308 of the share tracking module 125 updates 435 the sharing statistics for the first identifier.

Client 120B requests 440 to share the video content accessed 430. As discussed above, request may be triggered manually or automatically. Regardless, the request to share video content is again transmitted to the share tracking server 140 where it is received by the share request receiver engine 302 of the share tracking module 125. Upon receiving the request to share video content, the identifier generator engine 304 generates 445 a second identifier. The client-identifier associator engine 306 associates 450 the second identifier with client 120B. In one embodiment, the second identifier and/or client 120B will be associated with the first identifier and/or client 120A, thereby enabling a chain of discovery to be determined. The second identifier is transmitted 455 to client 120B, and client 120B shares 460 the second identifier.

Although the aforementioned event diagram illustrates an embodiment where a first and a second identifier are created to create a chain of discovery showing the sharing information. It should be appreciated that multiple subsequent identifiers linking back to the original identifier may also be created in the same manner therefore continuing to add to the chain of discovery.

Figure 5:
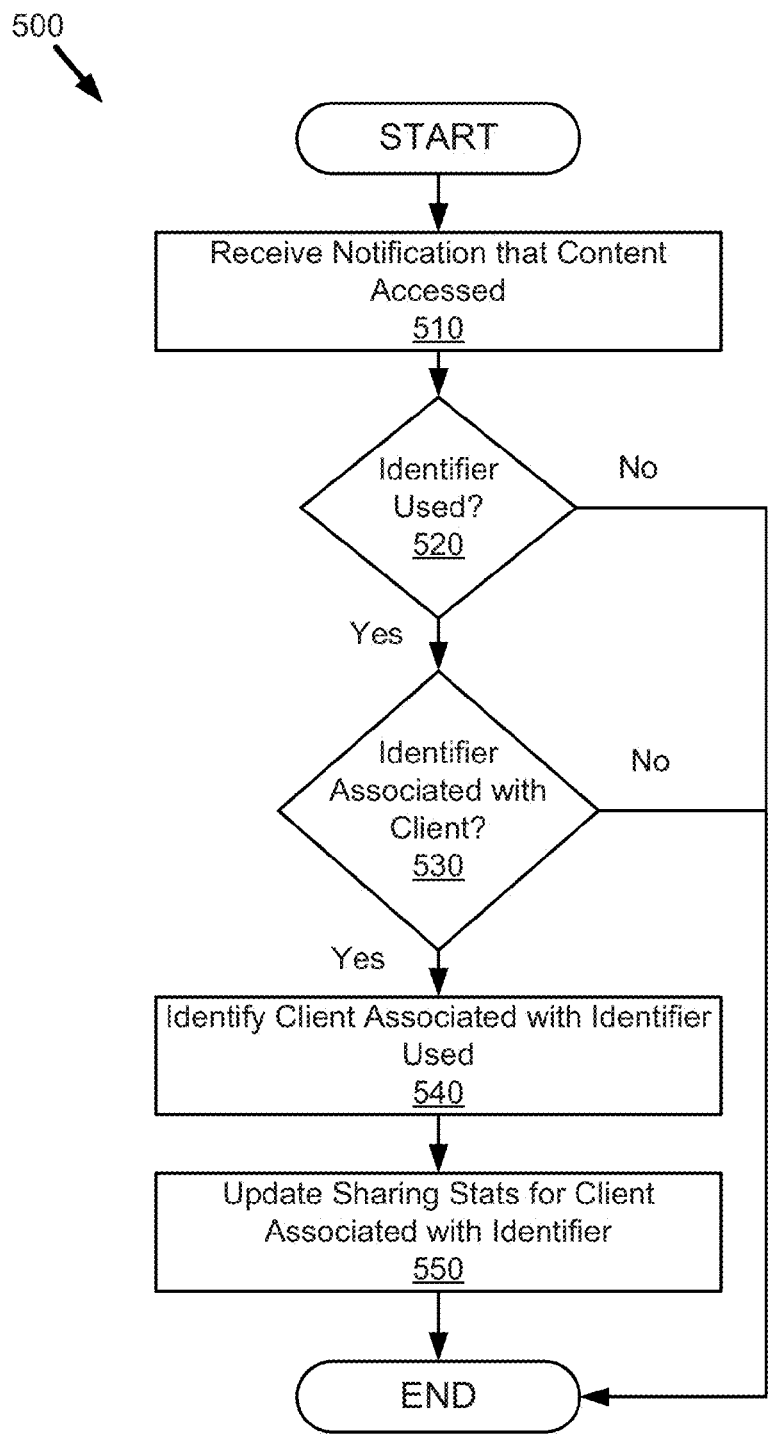
FIG. 5 is a flow chart of a method for updating sharing statistics according to one embodiment.

FIG. 5 is a flowchart illustrating a method 500 for updating sharing statistics according to one embodiment. In one embodiment, the analytics engine 308 receives 510 a notification that video content has been accessed on the video hosting server 110. The analytics engine 308 then determines 520 whether the video content was accessed using an identifier. If the analytics engine 308 determines the video content was accessed without using an identifier (520—No), the method ends. If the analytics engine 308 determines the video content was accessed using an identifier (520—Yes), the analytics engine 308 consults the client-identifier associations recorded by the client-identifier associator engine 306 and determines 530 whether the identifier is associated with a client. If the analytics engine 308 determines the identifier is not associated with a client (530—No), e.g., the client was not recognized or opted out of share tracking, the method ends. If the analytics engine 308 determines the identifier is associated with a client (530—Yes), the analytics engine 308 identifies 540 the client associated with the identifier and updates 550 the sharing statistics for the client associated with the identifier.

Figure 6:
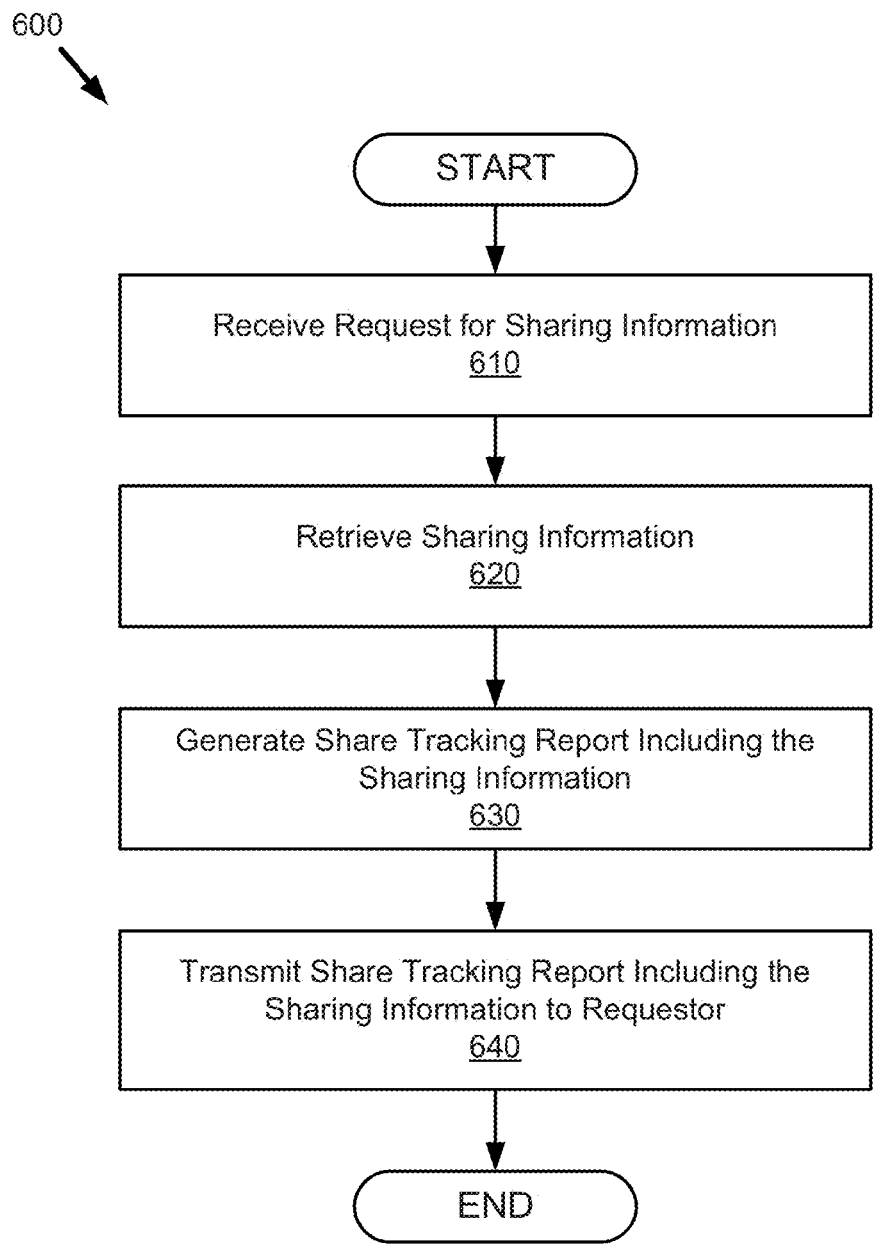
FIG. 6 is a flow chart of a method for generating a share tracking report according to one embodiment.

FIG. 6 is a flowchart illustrating a method 600 for generating a share tracking report including sharing information according to one embodiment. In one embodiment, the report generator engine 310 receives 610 a request for sharing information. As discussed above, the request could be from a video content provider 118, client 120 or the video hosting server 110. Responsive to receiving 610 the request for sharing information, the report generator engine 310 generates 620 a share tracking report including sharing information and transmits 630 the share tracking report including the sharing information to the requestor.

Example Share Tracking Reports

Figures 7, 8:
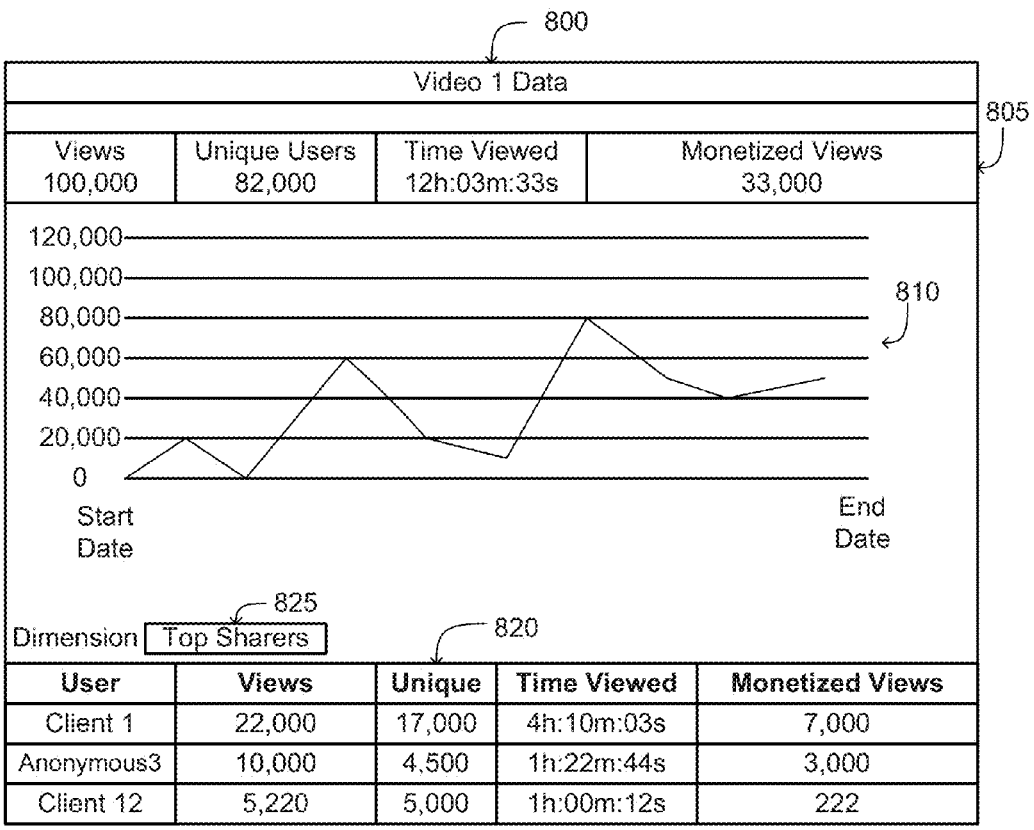
FIG. 7 is an example of a share tracking report according to one embodiment.
FIG. 8 is another example of a share tracking report according to one embodiment.

Using sharing statistics maintained by the analytics engine 308, the report generator engine 310 generates one or more share tracking reports describing the sharing of video content published online. For example, FIG. 7 illustrates one embodiment of a share tracking report 700 including sharing information generated by the report generator engine 310 of the share tracking module 125. Share tracking report 700 is an example of a share tracking report generated for a client 120 according to one embodiment. The share tracking report 700 includes a column 705 identifying the video content the client 120 has shared, columns 710 including sharing statistics regarding the client's shares, columns 715 including general statistics regarding video content, and columns 720 relating the sharing statistics to the general statistics. In other embodiments, different or additional information may be included in the share tracking report 700. In other embodiments, the share tracking report 700 may lack certain information.

In the illustrated example, the client 120 can see the influence the client's sharing. For example, reading across row 725, the client, by sharing Video 1, generated 50,000 additional views and 36,780 unique views, which accounted for 2% of Video 1's 2.5 million views and 1.9% of Video 1's unique views.

FIG. 8 shows another example of a share tracking report 800 including sharing information generated by the report generator engine 310 of the share tracking module 125. Share tracking report 800 is an example of a share tracking report generated for a video content provider 118 according to one embodiment. As illustrated, report 800 describes the performance of video content (Video 1 in this case) and includes sharing information. The report 800 includes a summary section 805 summarizing different interactions with video content. In the example of FIG. 8, the summary section 805 identifies the number of times the video content has been viewed, the number of unique viewers of the content, the total time that the content has been viewed and the number of content views that resulted in monetization. However, in other embodiments, the summary section 805 identifies different and/or additional interactions with the video content.

In one embodiment, the share tracking report 800 also displays a video content interaction graph 810 providing a graphical representation of the number of times the video content has been viewed in a specified interval. However, in other embodiments the video content interaction graph 810 provides a graphical representation of a different type of video content interaction, such as unique viewers, monetized views or any other type of interaction with video content. Additionally, the share tracking report 800 includes a dimensional detail view 820 which displays specific information about interactions with video content. A dimensional selector 825 allows a user to identify the type of information displayed in the dimensional detail view 820. In the example of FIG. 8, the dimensional detail view 820 displays information about the top sharing clients, allowing a user to review the clients 120 that were most influential in distributing the video content to other clients 120 and generating views. Depending on the embodiment, the top sharing clients may be ranked by any performance metric including but not limited to views, unique views, time viewed, or monetized views resulting from the client's sharing the video content. However, in other embodiments, the dimensional detail view 820 displays different types of data about video content interactions, allowing a user to analyze different aspects of video data interactions.

Figure 9:
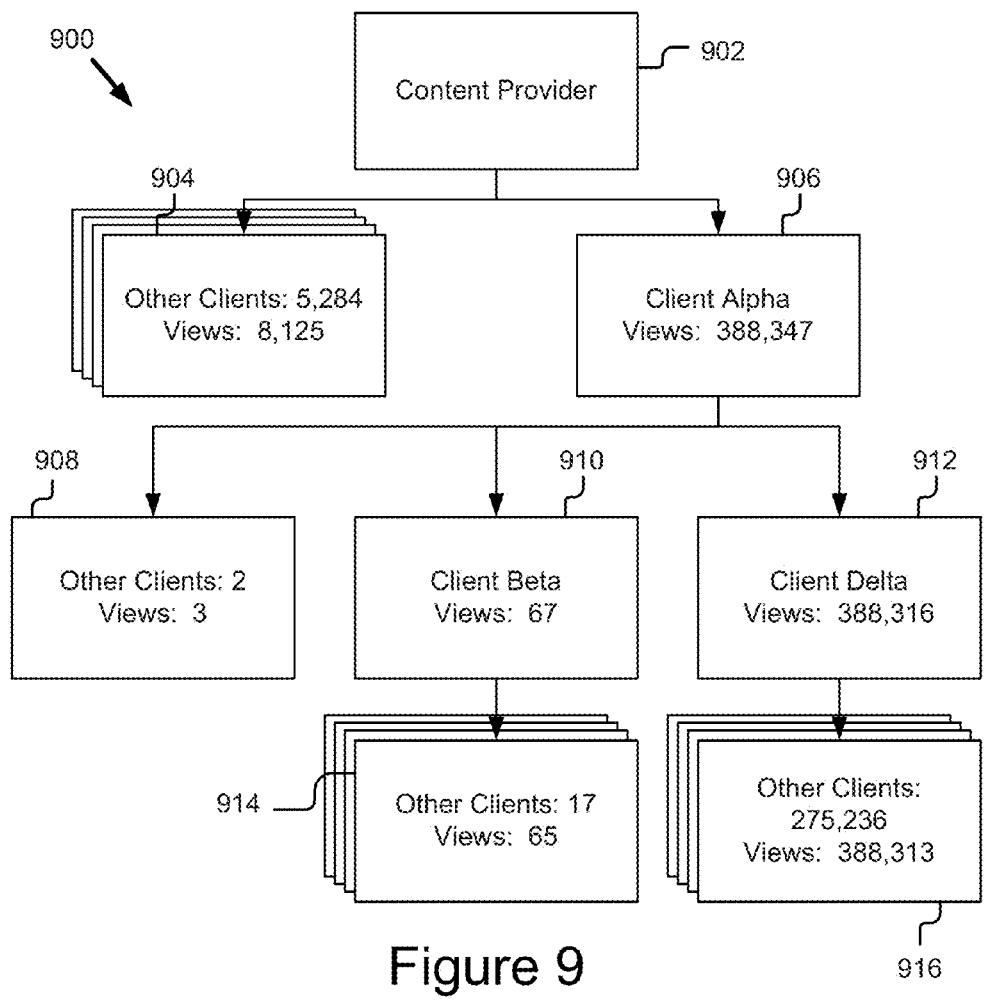
FIG. 9 is yet another example of a share tracking report according to one embodiment.

FIG. 9 shows yet another example of a share tracking report 900 including sharing information generated by the report generator engine 310 of the share tracking module 125. Share tracking report 900 is an example of a share tracking report generated at the request of a content provider 118 or video hosting server 110 according to one embodiment. Share tracking report 900, as illustrated, shows that the content provider 902 shared video content which was accessed by client alpha 906 and 5,284 other clients 904.

In one embodiment, the other clients 904 are grouped together because each of the other clients 904 did not meet a threshold for being individually identified in the chain of discovery. For example, in one embodiment, only a client that generates a threshold number of views (e.g. 100 views or 5% of total views) through the client's share are identified individually in the share tracking report 900. In another embodiment, the other clients 904 are grouped together because the individual identities of the other clients is unknown. For example, in one embodiment, all clients that are anonymous are grouped as other clients 904. In yet another embodiment, the other clients 904 are grouped together because they accessed the video content but did not share the video content. In one embodiment, the other clients 904 may have shared the video content but did not generate a request to share, e.g., they copy-pasted a first identifier rather than requesting a second identifier.

In the illustrated share tracking report 900, client alpha 906 is attributed with 388,347 views by sharing the video content with client beta 910, client delta 912 and two other clients 908. Client beta 910 shared the video content with seventeen other clients 914, and client delta 912 shared the video content with 275,236 other clients 916. Share tracking report 900 provides insight into how video content published by the content provider 902 is shared and distributed. For example, it illustrates that client delta 912 is influential in that client delta 912 accounted for 388,316 views. Thus, a content provider may want to reach out to client delta 912 in the future with similar video content or pay client delta 912 to share its video content. Share tracking report 900 also provides insight into clients that may not have broad viewership, but are influential in that the clients channel content to clients that do. For example, if every time client alpha 906 shares video content only a handful of clients access it. Client alpha 906 does not seem influential. However, if every time client alpha 906 shares video content client delta 912 shares the video content with its broad viewership, client alpha 906 may be quite influential. Thus, a content provider may want to reach out to client alpha 906 in the future with similar video content or pay client alpha 906 to share its video content.

Figure 10:
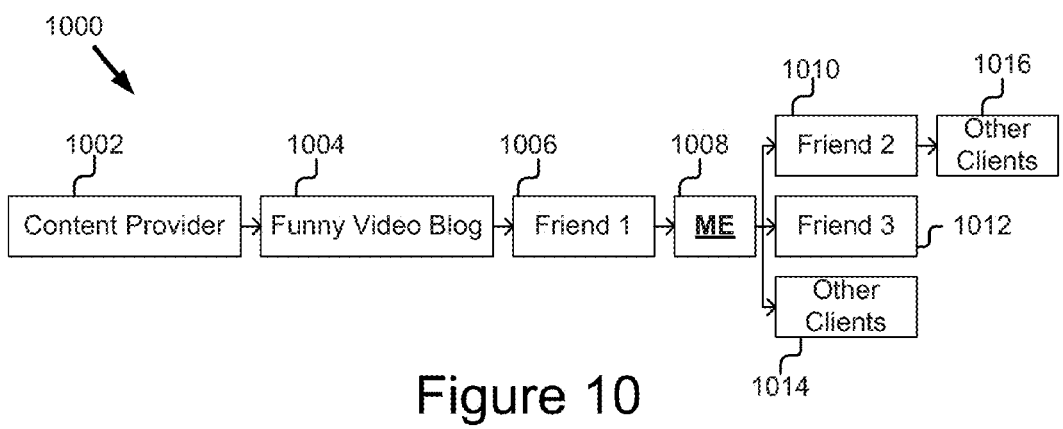
FIG. 10 is yet another example of a share tracking report according to one embodiment.

FIG. 10 shows yet another example of a share tracking report 1000 generated by the report generator engine 310 of the share tracking module 125. Share tracking report 1000 is an example of a share tracking report generated at the request of a client according to one embodiment. The chain of discovery illustrates that the content provider 1002 shared video content, which was subsequently shared by funny video blog 1004, which was subsequently shared by friend 1 1006, which was subsequently shared by me (the requestor) 1008 with friend 2 1010, friend 3 1012 and other clients 1014. Friend 2 1010 subsequently shared the video content with other clients 1016. Share tracking report 1000, therefore, shows both the upstream chain of discovery 1002-1008 and the downstream chain of discovery 1008-1016 for video content shared by the requesting a client 1008.

As discussed above, in other embodiments, the upstream chain of discovery is not included in the share tracking report and is not displayed to the requestor. In still other embodiments, the downstream chain of discovery is not included in the share tracking report and is not displayed to the requestor. In one embodiment, the length of the chain of discovery displayed to the requestor in the share tracking report is limited. For example, in one embodiment, the chain of discovery might be limited to the client 1006 that shared the video content with the requestor and the clients 1010-1014 that accessed the requestor's subsequent share of that video content.

Share tracking report 1000 gives the user insight into how the video content the requestor access reaches the requestor and who the requestor's sharing reaches. For example, the requestor can see that the requestor's friend 1 1006 discovered the video content on funny video blog 1004. The requestor may, therefore, want to investigate funny video blog 1004 for video content the requestor 1008 may also enjoy. The requestor 1008 can also see who viewed the video content because of the requestor's 1008 share. The requestor 1008 knows the friend 2 1010 and friend 3 1012 have accessed the video content and may want to engage the friends 1010, 1012 in conversation regarding the video content. Moreover, the requestor 1008 can see that friend 4 (not shown) has not viewed the video content, and the requestor 1008 can encourage friend 4 to access the video content.

Figure 11:
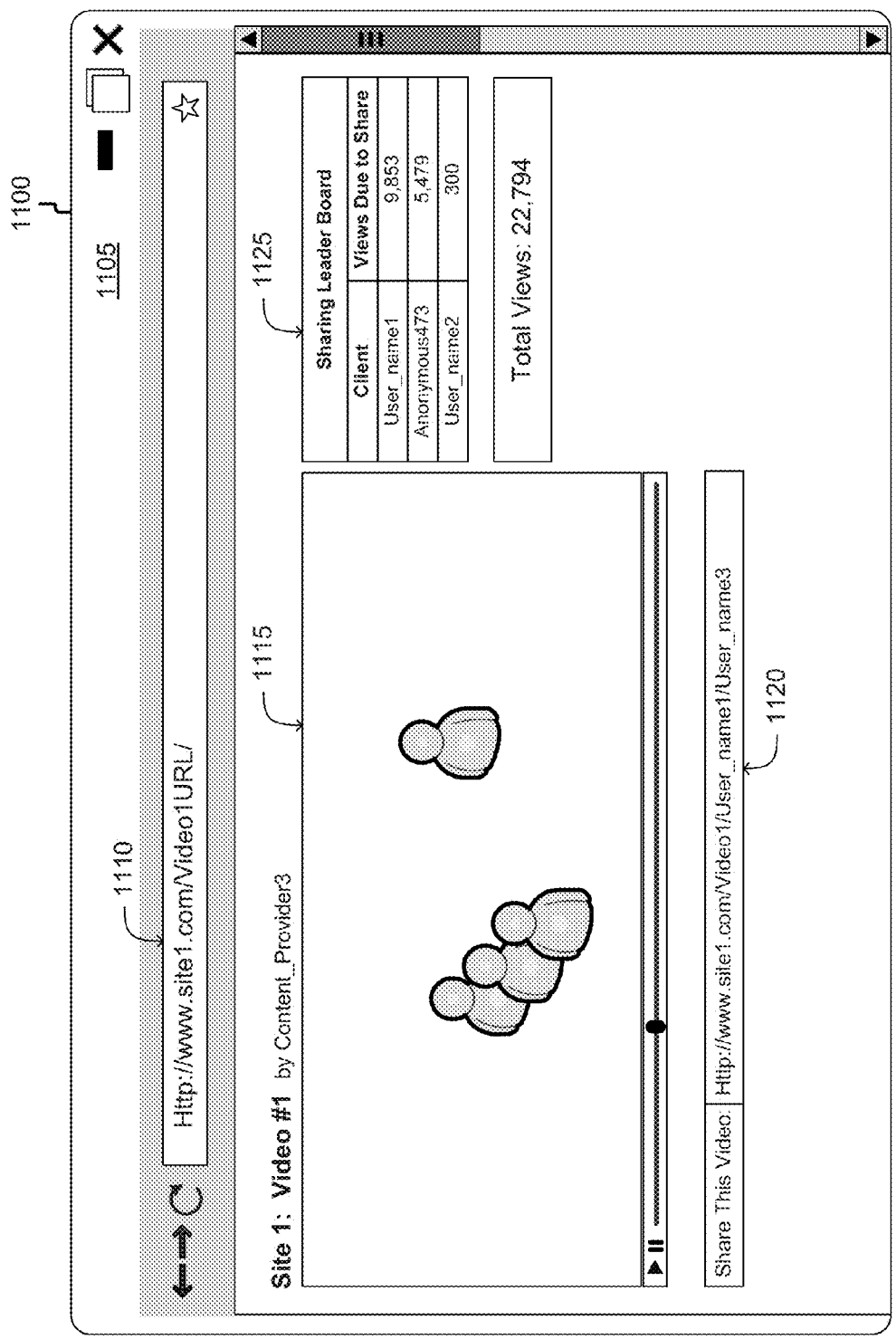
FIG. 11 is a graphic representation of an example of a user interface displaying online published video content and a share tracking report according to one embodiment.

FIG. 11 is graphic representation of an example of a user interface 1100 displaying online published content 1115 and a share tracking report 1125 according to one embodiment. In the illustrated example, a client (User_name 3) has accessed video content 1115 using a link shared by another client (User_name1). This is illustrated by the identifier 1120 that was generated when the browser 1105 loaded the content 1115. The identifier 1120 generated for User_name3 to share, in the illustrated embodiment, contains a portion identifying the content (video 1) and the chain of discovery (shared by User_name1 and subsequently by User_name3). In one embodiment, a "naked URL" 1110 is displayed in the browser 1105 allowing User_name3 to partially, or fully, opt out of the chain of discovery and share tracking, by sharing that link instead of identifier 1120.

In one embodiment, the share tracking report 1125 is a leaderboard ranking the clients responsible for the most views by sharing the video content using a generated identifier. In other embodiments, the clients may be ranked by unique views, monetized views, time watched or another metric. In one embodiment, the leaderboard is the leaderboard for sharing the content 1115 displayed. In another embodiment, the leaderboard may be global, that is the most influential clients in the system 100 or the most influential clients registered with the video hosting server 110 (depending on the embodiment).

The foregoing data/information is collected upon client consent. In some implementations, an account owner is prompted to explicitly allow share tracking. Further, the client or content provider may opt in/out of participating in such tracking activities.

The foregoing description of the embodiments has been presented for the purposes of illustration and description. It is not intended to be exhaustive or to limit the present embodiments to the precise form disclosed. Many modifications and variations are possible in light of the above teaching. It is intended that the scope of the present embodiments be limited not by this detailed description, but rather by the claims of this application. As will be understood by those familiar with the art, the present embodiments may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiments or its features may have different names, divisions and/or formats. Furthermore, as will be apparent to one of ordinary skill in the relevant art, the modules, routines, features, attributes, methodologies and other aspects of the present embodiments can be implemented as software, hardware, firmware or any combination of the three. Also, wherever a component, an example of which is a module, of the present embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiments are in no way limited to implementation in any specific programming language, or for any specific operating system or environment. Accordingly, the disclosure intended to be illustrative, but not limiting, of the scope of the embodiments, which is set forth in the following claims.

What is claimed is:

1. A method comprising:
receiving a request of a first client device to share video content published online in a social network service with a second client device of the social network service;
responsive to receiving the request, generating a first identifier associated with the video content published online, and associating the first identifier with the first client device;
generating, using a processor, sharing information associated with the video content published online, the sharing information comprising statistics information associated with a number of times the video content is shared between client devices in the social network service before the video content is accessed;
detecting a triggering event related to the video content, wherein detecting the triggering event comprises
receiving a notification that the video content is accessed by the second client device using a second identifier;
determining, using the processor, that the second identifier is associated with the first client device;
responsive to the determining, updating the sharing information associated with the video content published online with respect to the second client device and responsive to detecting the use of the second identifier, updating the sharing information associated with the first identifier;
and determining, using the processor, a chain of discovery in view of the sharing information, the chain of discovery indicating each of the client devices in the social network service that shared the video content.

2. The method of claim 1, the method further comprising:
receiving a request for a share tracking report from a requestor;
responsive to the request for the share tracking report, retrieving sharing information relevant to the request for the share tracking report;
generating the share tracking report comprising the relevant sharing information; and
sending the share tracking report to the requestor.

3. The method of claim 2, wherein the relevant sharing information comprises sharing information associated with one or more client devices of the client devices in the chain of discovery.

4. A system comprising:
a memory storing video content; and
a processor operatively coupled to the memory, the processor configured to:
receive a request of a first client device to share video content published online in a social network service with a second client device of the social network service;
responsive to receiving the request, generate a first identifier associated with the video content published online, and associate the first identifier with the first client device;
generate sharing information associated with the video content published online, the sharing information comprising statistics information associated with a number of times the video content is shared between client devices in the social network service before the video content is accessed;

detect a triggering event related to the video content, wherein detecting the triggering event comprises
receive a notification that the video content is accessed by the second client device using a second identifier;
determine that the second identifier is associated with the first client device;
responsive to the determined, update sharing information associated with the video content published online with respect to the second client device; and responsive to detecting the use of the second identifier, updating the sharing information associated with the first identifier; and
determine a chain of discovery in view of the sharing information, the chain of discovery indicating each of the client devices in the social network service that shared the video content.

5. The system of claim 4, wherein the processor is further configured to:
receive a request for a share tracking report from a requestor;
responsive to the request for the share tracking report, retrieve sharing information relevant to the request for the share tracking report;
generate the share tracking report comprising the relevant sharing information; and
send the share tracking report to the requestor.

6. The system of claim 5, wherein the relevant sharing information comprises sharing information associated with one or more client devices of the client devices from in the chain of discovery.

7. A non-transitory computer readable medium storing executable instructions, that when executed by a computing device, cause the computing device to:
receive a request of a first client device to share video content published online in a social network service with a second client device of the social network service;
responsive to receiving the request, generate a first identifier associated with the video content published online, and associate the first identifier with the first client device;
generate, by the computing device, sharing information associated with the video content published online, the sharing information comprising statistics information associated with a number of times the video content is shared between client devices in the social network service before the video content is accessed;
detect a triggering event related to the video content, wherein detecting the triggering event comprises
receive a notification that the video content is accessed by the second client device using a second identifier;
determine that the second identifier is associated with the first client device;
responsive to the determined, update sharing information associated with the video content published online with respect to the second client device; and responsive to detecting the use of the second identifier, updating the sharing information associated with the first identifier;
and determine, by the computing device, a chain of discovery in view of the sharing information, the chain of discovery indicating each of the client devices in the social network service that shared the video content.

8. The non-transitory computer readable medium of claim 7, wherein the executable instructions further cause the computing device to:
receive a request for a share tracking report from a requestor;
responsive to the request for the share tracking report, retrieve sharing information relevant to the request for the share tracking report;
generate the share tracking report comprising the relevant sharing information; and
send the share tracking report to the requestor.

9. The non-transitory computer readable medium of claim 8, wherein the relevant sharing information comprises sharing information associated with one or more client device of the client device in the chain of discovery.

* * * * *